United States Patent [19]

Haland

[11] Patent Number: 4,958,854
[45] Date of Patent: Sep. 25, 1990

[54] LOCKING DEVICE FOR A PRE-TENSIONER FOR A VEHICLE SAFETY BELT

[75] Inventor: Lars Y. Haland, Falsterbo, Sweden

[73] Assignee: General Engineering (Netherlands) B.V., Utrecht, Netherlands

[21] Appl. No.: 346,765

[22] Filed: May 3, 1989

[30] Foreign Application Priority Data

May 4, 1988 [SE] Sweden .................................. 8801690

[51] Int. Cl.$^5$ ....................... B60R 22/36; B60R 22/46
[52] U.S. Cl. ..................................... 280/806; 297/480
[58] Field of Search ................ 280/801, 806; 297/480; 242/107

[56] References Cited

U.S. PATENT DOCUMENTS

| | | | |
|---|---|---|---|
| 3,372,777 | 3/1968 | Filippi et al. | 280/806 |
| 4,585,184 | 4/1986 | Kawaguchi et al. | 280/806 |
| 4,664,334 | 5/1987 | Asagiri et al. | 280/806 |
| 4,705,296 | 11/1987 | Andersson et al. | 280/806 |

FOREIGN PATENT DOCUMENTS 195268  9/1986  European Pat. Off. ............ 280/806

Primary Examiner—Richard A. Bertsch
Attorney, Agent, or Firm—Spencer & Frank

[57] ABSTRACT

A locking device is provided in a pre-tensioner for a safety belt or safety harness in a vehicle. The pre-tensioner is mounted on a plate secured to the seat of the vehicle. In order to prevent the pre-tensioner being triggered by forward adjustment of the seat, a plate is provided which is pivotally mounted, so that the plate can swing to a locking position on forward movement of the seat. When in the locking position, an arcuate edge of the plate is located adjacent a lever forming part of the pre-tensioner preventing forward movement thereof and thus preventing triggering of the pre-tensioner.

9 Claims, 4 Drawing Sheets

LOCKING DEVICE FOR A PRE-TENSIONER FOR A VEHICLE SAFETY BELT

BACKGROUND OF THE INVENTION

This invention relates to a locking device for a pre-tensioner for a vehicle safety belt, which term includes a safety harness, and more particularly relates to a locking device, for use with a pre-tensioner where the triggering mechanism of the pre-tensioner is mounted on a movable seat, the locking device being intended to prevent unintentional triggering of the pre-tensioner subsequent to a forward movement of the seat relative to the vehicle.

It has been proposed previously to provide a pre-tensioner for use with a vehicle safety belt, to tighten the safety belt in the event of very severe braking, or in the event of a collision. The pre-tensioning of the belt will serve to hold the person secured by the belt firmly in their seat, to prevent the person being thrown forward in the vehicle. The pre-tensioner includes a triggering arrangement, sensitive to deceleration of the vehicle, to indicate operation of the pre-tensioner. Such a pre-tensioner is disclosed in European Publication No. 0239925, and in U.S. Pat. No. 4,768,809, the contents of which are incorporated herein by way of reference.

If the pre-tensioner assembly, incorporating the triggering arrangement, is mounted on a movable seat, there is a risk that the triggering arrangement may be unintentionally actuated if the seat is moved forwards quickly and is then stopped abruptly, for example if the position of the seat is adjusted by a person sitting on the seat, and the seat is moved swiftly forward until it engages the stop provided at the end of the track on which the seat is mounted.

OBJECT OF THE INVENTION

The present invention seeks to provide a simple, operationally reliable locking device which will operate to prevent unintentional triggering of a pre-tensioner mechanism, mounted on a seat, in response to fast forward movement of the seat, and abrupt stopping of the seat, during adjustment of the seat.

BRIEF SUMMARY OF THE INVENTION

According to this invention there is provided a pre-tensioner for a safety belt or safety harness in a motor vehicle, the pre-tensioner incorporating a triggering mechanism which is mounted on a movable seat in a vehicle, wherein a looking device is provided to prevent unintentional triggering of the pre-tensioner on adjustment of the position of the seat, said locking device comprising pendulum means adapted, as a result of its inertia, to swing, during acceleration of the seat on forward movement thereof, from a position of rest in which the pendulum means does not prevent triggering of the pre-tensioner into a locking position in which the pendulum means is situated in the path of a movable part of the pre-tensioner, thus preventing triggering of the pre-tensioner.

Preferably the pendulum means is mounted to swing freely about a pivot axis.

Conveniently the pendulum means has a mass and a centre of gravity such that the pendulum means remains, as a result of its inertia, in the locking position during deceleration of the seat when the seat reaches a new position to which it is being adjusted.

Advantageously the centre of gravity of the pendulum means(31) is, when the pendulum means is at its position of rest, located beneath the pivot axis(32) of the pendulum means, and the centre of gravity of the pendulum means is at a higher level when the pendulum means is in the locking position, so that the pendulum means swings back to the position of rest by itself when the seat has assumed the new position.

Preferably the centre of gravity of the pendulum means is substantially level with or above the pivot axis of the pendulum means when in the locking position.

Conveniently the pendulum means is in the form of a plate pivoted about a horizontal axis which extends substantially at right angles to the direction of advance of the vehicle.

Preferably the plate has an edge in the form of an arc of a circle, said edge being adapted to be located adjacent the said movable part of the pre-tensioner when the plate is in the locking condition, the centre of curvature of the arcuate edge being situated on the pivot axis of the plate.

Conveniently the plate is provided with at least one recess or aperture.

Preferably the pendulum means incorporates one or more parts which are mechanically relatively weak, and which are adapted to undergo deformation or breaking if the pendulum means is in the looking position when the vehicle is subjected to severe deceleration associated with an accident.

DESCRIPTION OF PREFERRED EMODIMENT

Figure 1:
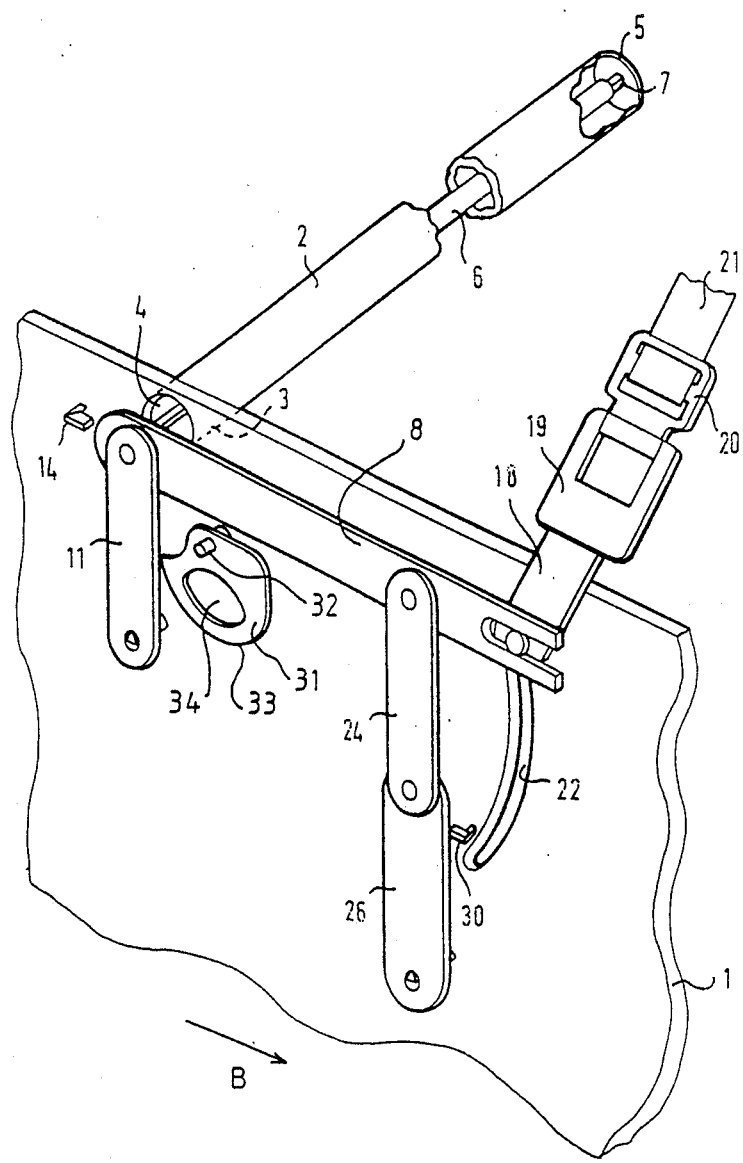
FIG. 1 is a perspective view of the most important components of one example of an arrangement in accordance with the invention.

The embodiment of the invention which is now to be described consists of several moving elements which are mounted in position on pivots and which engage fixed stops. In a practical embodiment of the invention the various components are mounted on the frame of a seat in a motor vehicle. Whilst the components may be mounted on various frame elements, in a simple embodiment, as is now to be described, the various movable components are mounted on a support plate 1. The support plate 1 can be fixed in position on the side of a seat mounted in a motor vehicle. The plate will be mounted in a vertical orientation, in a vertical plane aligned with the axis of the car. The plate may be mounted in position by any appropriate means.

A tubular housing 2 (which may constitute part of the seat frame) is mounted on one side of the plate 1, the tubular housing 2 having an open end 3 which is secured to one side of the plate in alignment with an aperture 4 formed in the plate. The housing 2 extends horizontally substantially transversely to the axis of the motor car. The tubular housing 2 is closed by an end plate 5 located at the end of the housing remote from the plate 1. The end plate 5 may be connected to any suitable support (not shown).

An elongate torsion bar 6 is mounted in the tubular housing. At a first end the torsion bar 6 has a square cross sectioned projection peg 7 which is retained in a correspondingly shaped aperture formed in the end plate 5 of the housing 2. The torsion bar 6 extends axially through the tubular housing 2 and projects through the aperture 4 formed in the plate 1. The projecting portion of the torsion bar comprises a square sectioned peg which is received in a correspondingly shaped square aperture 7' formed in a drive arm 8.

A cyclindrical projection 9 extends axially from the square sectioned peg received in the aperture 7', and the cylindrical projection 9 is received in a circular aperture 10 formed in a supporting lever 11. If it is desired to provide low friction engagement between the torsion bar 6 and the lever 11, the end of the torsion bar may have a triangular shape projection one apex of which engages the inner edge of a round aperture formed in the lever 11. The supporting lever 11 is in a substantially vertical position. At the lower end of the support lever 11 there is a circular aperture 12 in which is located a triangular bearing pin 13 which projects substantially horizontally from the plate 1. An apex of the triangular pin supportingly engages the aperture 12. Thus the lever 11 is pivotally supported at its lower end in a virtually frictionless manner, and when in the illustrated vertical position provides support for the projection 9, thus providing support for the end of the torsion bar 6 extending through the aperture 4.

Figure 2:
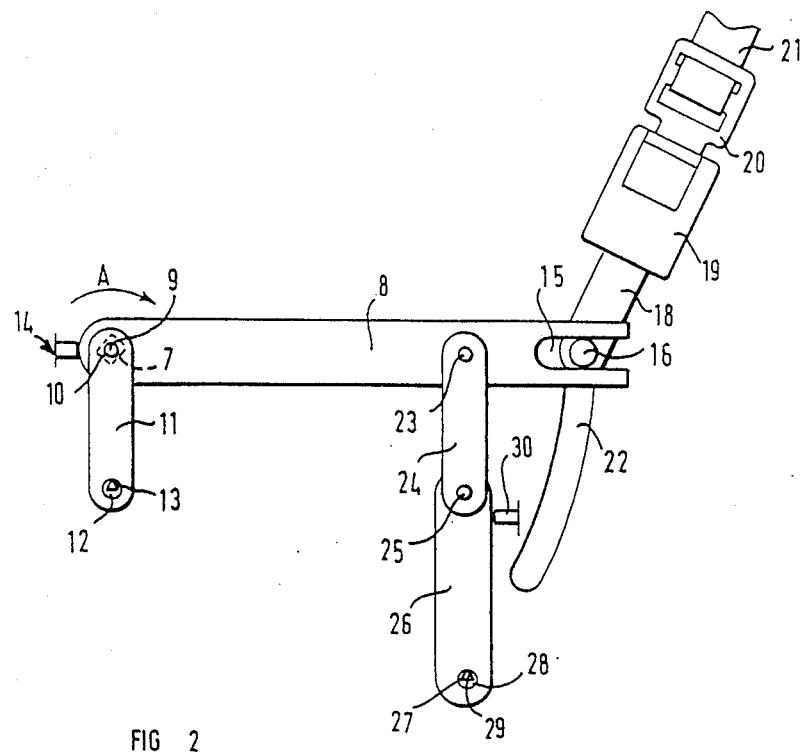
FIG. 2 is a side elevational view of the main operative parts of the arrangement shown in FIG. 1.

A stop 14 is provided, fixed in some convenient way to the plate 1, which abuts the left-hand end of the drive arm 8 (as illustrated), thus preventing the drive arm 8 from moving in a leftward direction from the position illustrated in FIGS. 1 and 2.

The drive arm 8 is shown, in FIGS. 1 and 2, in a substantially horizontal condition. At the right-hand end of the drive arm 8 there is formed an axially extending slot 15 which receives a transverse pin 16. The pin 16 is connected to a steel strap 18 extending from a buckle 19 adapted to receive a tongue 20 to which is connected a safety belt 21. The strap 18, the buckle 19, the tongue 20 and the seat belt 21 may be of a conventional design. The transverse pin 16 also extends into an arcuate guide slot 22 formed in the plate 1. The centre of curvature of the arcuate guide slot 22 is substantially coincident with the longitudinal axis of the torsion bar 6. The apparatus is illustrated, in FIGS. 1 and 2, with the transverse pin 16 located substantially at the uppermost end of the arcuate guide slot 22.

The drive arm 8 is pivotally connected, by means of a pivot pin 23, to an over-dead centre linkage comprising a first lever 24 which is pivotally connected by means of a pivot 25 to a second lever 26 which in turn is pivotally mounted by means of a substantially friction-free bearing 27 on the plate 1. The bearing 27 may comprise an aperture 28 formed in the lower end of the lever 26, resting on the apex of a triangular support 29 projecting from the plate 1. A stop 30 is provided, again mounted on the plate in some convenient way which engages the right-hand side of the lever 26 adjacent the pivotal connection 25.

The torsion bar 6 is provided to apply a rotational force to the drive arm 8 in the direction indicated by the arrow A in FIG. 2. The torsion bar 6 also, however, provides an "inertia" effect and it will be appreciated that when the vehicle in which the described arrangement is mounted decelerates, the end of the torsion bar 6 projecting through the aperture 4 will tend to move forwardly (i.e. towards the right as illustrated) due to the inertia of the torsion bar. Means may be provided to retain the end of the torison bar projecting through the aperture 4 in its initial position until a predetermined deceleration occurs. These means may comprise magnetic means applying a force to the end of the torsion bar tending to retain the torsion bar is position with the left-hand end of the drive arm 8 in engagement with the stop 14, or may comprise a spring providing a similar effect.

As will be appreciated, the described apparatus will normally be in the condition illustrated in FIGS. 1 and 2. It will be observed that although the torsion bar is applying a force tending to rotate the drive arm in the direction illustrated by the arrow A, the drive arm 8 cannot actually rotate in this direction. The reason for this is that the over-dead-centre linkage constituted by the levers 24,26 is in such a position that the pivot points of these levers, 23,25 and 27 are all arranged substantially on a single straight line, but the pivot 23 is located slightly to the left of the line defined by the pivots 25 and 27. Thus the force tending to rotate the drive arm 8 in the direction of the arrow A applies a downward force to the combined levers 24,26 which tends to move the pivot point 25 towards the right. However, the pivot point 25 cannot move to the right because of the presence of the stop 30.

When a motor vehicle in which the described device is mounted is subjected to a rapid deceleration, in excess of a predetermined deceleration, the end of the torsion bar projecting through the aperture 4 will tend to move to the right as shown in FIG. 2. Assuming the decelerational force is sufficient, the torsion bar will move to the right overcoming any bias applied to the torsion bar by the above-mentioned spring or magnetic means. As the free end of the torsion bar moves towards the right, so the drive arm 8 will also move towards the right. The part of the drive arm 8 defining the elongatge slot 15 will thus move to the right relative to the transverse pin 16, and also the pivot point 23 will move to the right and will then be located towards the right of the line defined by the pivot points 27 and 25. Thus the operative condition of the over-dead-centre linkage is altered, and the over-dead-centre linkage no longer prevents rotation of the drive arm 8. As soon as the pivot point 23 crosses the line defined by the pivot points 27 and 25, the rotational force applied to the drive arm 8 by the torsion bar 6, tending to rotate the drive arm 8 in the direction of the arrow A, will tend to cause the over-dead-centre linkage to move in such a direction that the pivot point 25 moves towards the left. There is no stop provided to prevent this movement, and thus the pivot point 25 does move towards the left enabling the drive arm 8 to move in a clockwise direction as indicated by the arrow 30. The movement of the drive arm 8 causes the pin 16 to move along the arcuate guide slot 22 formed in the plate 1, moving the buckle 19 and the tongue 20 downwardly, and applying tension to the safety belt strap 21. Thus, as soon as a deceleration in excess of a predetermined decleration is detected, the described apparatus will be actuated, and a pre-tension will be applied to the safety belt 21, retaining the person wearing the safety belt securely in position in their seat.

It will be observed that the arm 11 effectively supports the free end of the torsion bar 6 in such a way that the free end of the torsion bar is able to move forwardly, when the predetermined deceleration is exceeded, in a virtually frictionless manner. The free end of the torsion bar could be mounted in position on a roller bearing or the like, but it has been found that such a roller bearing may have a tendency to "stick" particularly if the roller bearing is not operated regularly. Of course it is to be understood that the presently described apparatus is intended to function only in an accident situation since, of course, after the aparatus has been actuated it is necessary to re-set the apparatus before the apparatus is ready for re-use. It is thus envisaged that the predetermined deceleration mentioned above will be selected so that the apparatus will only function during a real accident situation and not under any ordinary driving circumstances. The described arrangement therefore provides a support for the free end of the torsion bar which possesses satisfactory characteristics. However, it is envisaged that the end of the torsion bar may be supported in various other ways that would be satisfactory.

Figure 3:
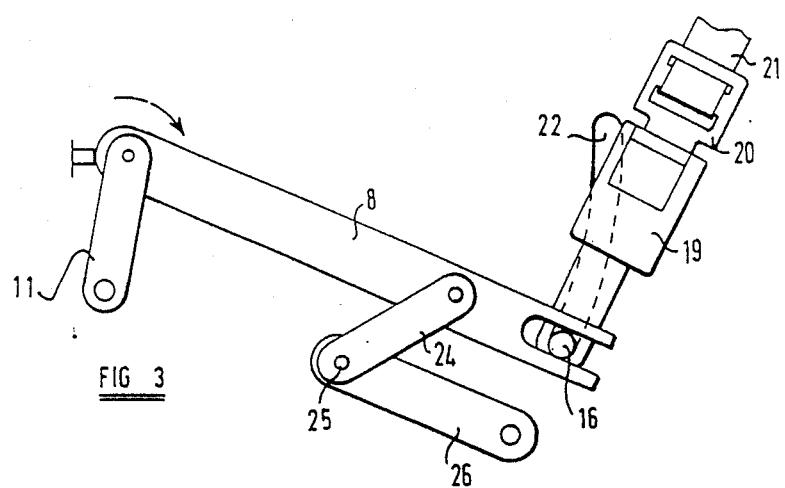
FIG. 3 is a view corresponding to FIG. 2 showing the parts illustrated therein in an alternative condition after a deceleration in excess of a predetermined deceleration has occured.

It is envisaged that it will be desirable to provide a mechanism such as a catch engageable with the strap 18 or the pin 16 when the drive arm 8 has moved to the position illustrated in FIG. 3 to retain the buckle 19 in the lower position, since, of course, the buckle 19 will then be subjected to a significant force tending to move the drive buckle 19 upwardly as the seat belt retains the passenger in his seat during the accident. The mechanism may be of any appropriate design, but must perform the function of retaining the buckle 19 in the lower position.

Figure 4:
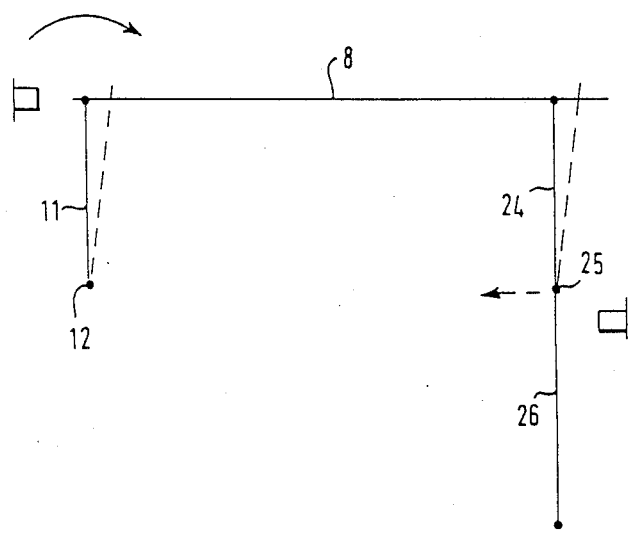
FIG. 4 is a diagrammatic view for purposes of explanation.

FIG. 4 is a diagrammatic view of the apparatus described above with reference to FIGS. 1 to 3. This figure illustrates the initial position of the various components in a solid line and shows, in a dotted line, the position of the arms 11 and 24 after the drive arm 8 has moved slightly towards the right. It can thus be understood how the pivot point 25 is then able to move towards the left to enable the drive arm 8 to execute the necessary rotary movement.

As can be seen in FIG. 1 a plate or disc 31 is provided which is pivotally mounted on a pivot pin 32 fixed to the support plate 1. The axis of the pivot pin 32 extends horizontally at right-angles to the plane of the plate 1. Thus the axis of the pivot is substantially at right-angles to the direction in which the vehicle moves, as indicated by the arrow B in FIG. 1. The plate 31, which forms a pendulum, is provided with an arcuate side edge 33, the centre of curvature of which is coincident with the pivot pin 32. In the normal or rest position of the pendulum, as illustrated in FIG. 1, this arcuate edge 33 is located at the lower-most part of the plate or pendulum 31. The plate 31 is also provided with an oval aperture 34, the size and shape of which may be selected to adjust both the mass and the centre of gravity of the disc 31. It is to be appreciated that the edges of the disc may be provided with recesses or cut-outs for the same purpose.

The disc 31 is intended to act as a pendulum, and in the described embodiment the centre of gravity of the pendulum is located beneath the pivot axis 32, when the pendulum is in its initial or rest position as shown in FIG. 1. It will be understood that if the seat on which the pre-tensioner, as described, is mounted is pushed forward quickly, for example in the direction of the arrow B, the plate 31 will, as a result of its inertia, swing up rearwardly to the position illustrated in FIG. 5. This position may be termed the locking position. The centre of gravity may now be at the same level as, or even above, the level of the pivot axis 32. It will be appreciated that in this poistion the arcuate edge 33 is located immediately adjacent the support lever 11, thus preventing forward movement of the support lever 11, consequently preventing forward movement of the drive arm 8. This effectively prevents the triggering of the pre-tensioner.

Figure 5:
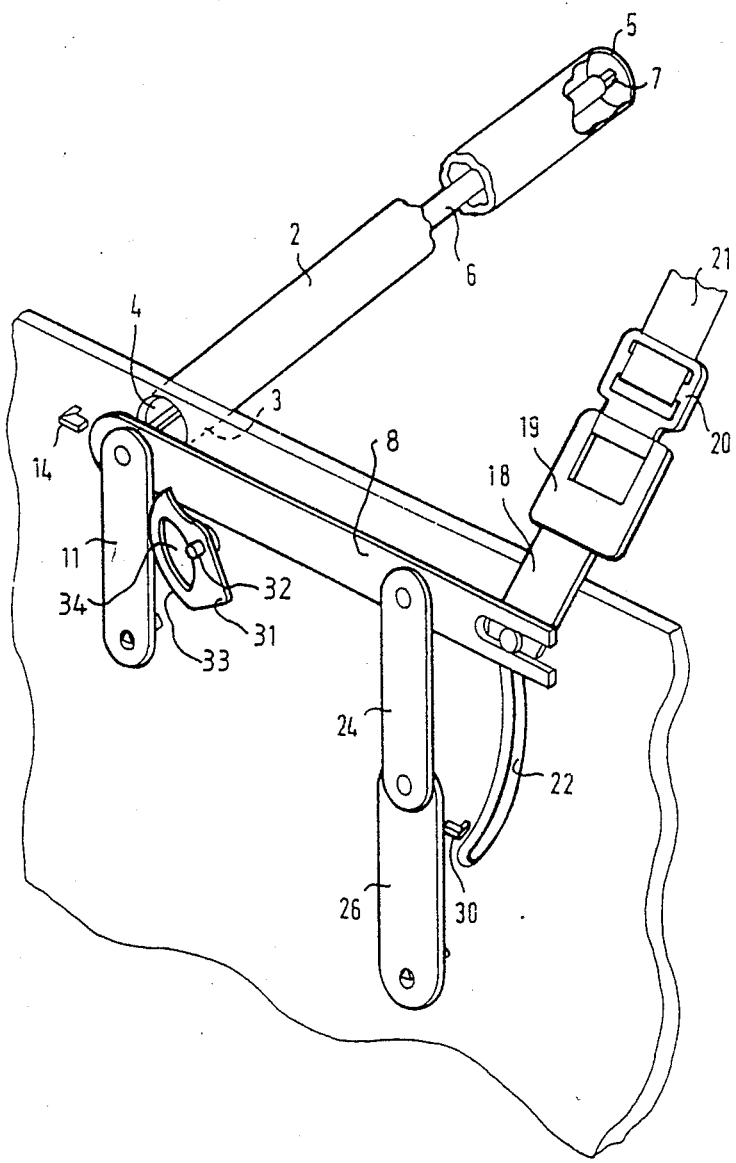
FIG. 5 is a view corresponding to FIG. 1 illustrating the components thereof in an alternative condition.

It will thus be appreciated that during the forward acceleration of the seat, the plate 31 swings, like a pendulum, up into the locking position illustrated in FIG. 5 in which it prevents displacement of the torsion bar 6. During any sudden deceleration of the seat, for example as the seat engages the stop at the end of the track upon which the seat moves, the plate 31 remains in the locking position as a result of its inertia. However, after the seat has been located in its new position on the track, the plate 31 returns, like a pendulum, to its initial position, as illustrated in FIG. 1.

It is advantageous to give the plate 31 a configuration such that the centre of gravity is situated relatively close to the pivot point 32. Thus the plate 31 will readily swing up into the locking position, thus providing a large angle of deflection.

The plate 31 is mounted on the pivot 32 to swing freely. If the vehicle decelerates severely, or is in a collision when the pendulum is in its normal position, as illlustrated in FIG. 1, the plate 31 will swing forwardly, so that the arcuate edge 33 moves away from the lever 11, and thus the plate 31 will not prevent ordinary triggering of the pre-tensioner.

The plate 31 may be designed with portions which are, mechanically, rather weak, so as to break or to be deformed by pressure applied thereto by the lever 11. If the plate 31 is in the locking condition, as illustrated in FIG. 5, in the event that an accident should occur and the vehicle is subjected to severe deceleration or subjected to collision. Under such circumstances the lever 11 will tend to move forwardly due to the inertia of the torsion bar 6. The forward pressure will be significantly greater than the pressure generated merely upon forward moving of the seat in an adjustment of the position of the seat. The configuration of the aperture 34 may be such as to define relatively narrow necks which join the part of the plate defining the arcuate edge 33 to the remainder of the plate as mounted on the pivot 32. These necks may be dimensioned to be relatively weak so that they will snap or to be deformed under such accident conditions, permitting the support lever 11 to move forwardly enabling the per-tensioner, triggered.

Although the invention has only been described with reference to one embodiment of the locking device, it is to be appreciated that many modifications may be effected without departing from the scope of the invention as defined by the following Claims.

The plate 31 which acts as a pendulum need not swing freely, but may, for example, be biassed by a spring in order to damp movement of the plate 31, or to assist in returning the plate to the initial position. Whilst the invention has been described with reference to an embodiment in which the pendulum is in the form of a plate having a centre of gravity beneath the pivot axis, in alternative embodiments of the invention the pendulum may have a centre of gravity above the pivot axis, so that the centre of gravity is lowered when the pendulum swings to its locking position. Thus the pendulum may consist of a standing inertia device which is adapted to topple to a position which it blocks movement of the arrangement which triggers the pre-tensioner in the event that the pendulum is subjected to deceleration. If the pendulum is arranged that the centre of gravity is located above the pivot point, then the pendulum must, however, be provided with some means to return the pendulum to its initial position, when the seat has been adjusted to a new position. Such means may comprise spring means or the like. The pendulum may have any desired shape and may be provided with holes or recesses for the adjustment of the total mass of the pendulum and for the adjustment of the centre of gravity.

Whilst the locking system has been illustrated in one particular type of pre-tensioner it is to be appreciated that equivalent locking systems, within the scope of the Claims, may be used on other types of pre-tensioner.

What is claimed is:

1. A pre-tensioner for a safety belt or safety harness in a motor vehicle, the pre-tensioner incorporating a triggering mechanism which is responsive to deceleration of the motor vehicle and which is mounted on a movable seat in the vehicle, wherein a locking device is provided to prevent unintentional triggering of the pretensioner on adjustment of the position of the seat, said locking device comprising pendulum means adapted, as a result of its inertia, to swing, during acceleration of the seat on forward movement thereof, from a position of rest in which the pendulum means does not prevent triggering of the pretensioner into a locking position in which the pendulum means is situated in the path of a movable part of the pre-tensioner, thus preventing triggering of the pre-tensioner.

2. A pre-tensioner according to claim 1 wherein the pendulum means is mounted to swing freely about a pivot axis.

3. A pre-tensioner according to claim 1 wherein the pendulum means has a mass and a centre of gravity such that the pendulum means remains, as a result of its inertia, in the locking position during deceleration of the seat when the seat reaches a new position to which it is being adjusted.

4. A pre-tensioner according to claim 1 wherein the centre of gravity of the pendulum means is, when the pendulum means is at its position of rest, located beneath the pivot axis of the pendulum means, and the centre of gravity of the pendulum means is at a higher level when the pendulum means is in the locking position, so that the pendulum means swings back to the position of rest by itself when the seat has assumed the new position.

5. A pre-tensioner according to claim 4 wherein the centre of gravity of the pendulum means is substantially level with or above the pivot axis of the pendulum means when in the locking position.

6. A pre-tensioner according to claim 1 wherein the pendulum means is in the form of a plate pivotted about a horizontal axis which extends substantially at right angles to the direction of advance of the vehicle.

7. A pre-tensioner according to claim 6 wherein the plate has an edge in the form of an arc of a circle, said edge being adapted to be located adjacent the said movable part of the pre-tensioner when the plate is in the locking condition, the centre of curvature of the arcuate edge being situated on the pivot axis of the plate.

8. A pre-tensioner according to claim 6 wherein the plate is provided with at least one recess or aperture.

9. A pre-tensioner according to claim 1 characterised in that the pendulum means incorporates one or more parts which are mechanically relatively weak, and which are adapted to undergo deformation or breaking if the pendulum means is in the locking position when the vehicle is subjected to servere deceleration associated with an accident.

* * * * *